US010034466B2

(12) United States Patent
Essafi

(10) Patent No.: US 10,034,466 B2
(45) Date of Patent: Jul. 31, 2018

(54) FISHING LINE CASTING DEVICE

(71) Applicant: Hamid Essafi, Pierrefonds (CA)

(72) Inventor: Hamid Essafi, Pierrefonds (CA)

( * ) Notice: Subject to any disclaimer, the term of this patent is extended or adjusted under 35 U.S.C. 154(b) by 130 days.

(21) Appl. No.: 15/275,421

(22) Filed: Sep. 25, 2016

(65) Prior Publication Data

US 2017/0086437 A1 Mar. 30, 2017

(30) Foreign Application Priority Data

Sep. 26, 2015 (GB) .................................. 1517075.6

(51) Int. Cl.
*A01K 91/02* (2006.01)
*A01K 87/00* (2006.01)

(52) U.S. Cl.
CPC ............ *A01K 91/02* (2013.01); *A01K 87/007* (2013.01)

(58) Field of Classification Search
CPC ......... A01K 91/02; A01K 87/007; F41B 5/12; F41B 7/00; F41B 7/04; F41B 7/046; F41B 7/08
See application file for complete search history.

(56) References Cited

U.S. PATENT DOCUMENTS

| 707,000 | A | 8/1902 | Pease |
| 1,054,916 | A | 3/1913 | Palmer |
| 1,469,883 | A | 10/1923 | Massey |
| 1,473,507 | A | 11/1923 | Obermaier |
| 2,089,744 | A | 8/1937 | Golden |
| 2,548,102 | A | 4/1951 | Elliott |
| 2,662,329 | A | 12/1953 | Henry |
| 2,873,547 | A * | 2/1959 | Coelho .................. A01K 91/02 124/27 |
| 2,952,091 | A | 9/1960 | Blanchard |
| 3,000,129 | A * | 9/1961 | Rainey ................... A01K 91/02 124/38 |
| 3,255,548 | A | 6/1966 | Whritenour |
| 3,266,184 | A * | 8/1966 | Brown .................... A01K 91/02 124/16 |
| 3,656,252 | A | 4/1972 | Sherman |
| 3,828,459 | A | 8/1974 | Easom |
| 4,127,956 | A | 12/1978 | McNair, Jr. |
| 4,349,978 | A | 9/1982 | Philip |
| 4,627,188 | A | 12/1986 | Razote |
| 4,631,852 | A | 12/1986 | Whritenour |
| 4,682,437 | A * | 7/1987 | Akerberg ............... A01K 91/02 43/19 |

(Continued)

FOREIGN PATENT DOCUMENTS

| AU | 2003272769 | 9/2010 |
| CA | 2632864 | 4/2004 |

(Continued)

*Primary Examiner* — Christopher R Harmon

(57) ABSTRACT

A device for assisting casting and retrieval of a fishing line to which is attached a terminal tackle. The device includes a guide ramp along which a carriage is slidable and a biasing element biasing the carriage towards the distal end of the guide ramp. A carriage pulling mechanism can be operated by a power drive to selectively pull the carriage away from the distal end of the guide ramp. A release mechanism can selectively disengage the carriage and carriage pulling mechanism from each other to allow the biasing element to propel the carriage along the ramp to cast the terminal tackle and fishing line.

19 Claims, 6 Drawing Sheets

(56) References Cited

U.S. PATENT DOCUMENTS

| | | |
|---|---|---|
| 5,036,616 A | 8/1991 | Wilsey |
| 5,421,116 A | 6/1995 | Moon |
| 5,735,074 A * | 4/1998 | Stauffer ............... A01K 91/02 124/16 |
| 5,926,991 A | 7/1999 | Chesnut |
| 6,209,531 B1 | 4/2001 | Boon |
| 6,389,732 B1 | 5/2002 | Daniel |
| 6,412,722 B1 | 7/2002 | Kreuser et al. |
| 6,880,286 B2 | 4/2005 | Wyman et al. |
| 7,409,794 B2 | 8/2008 | Triano et al. |
| 7,698,851 B1 * | 4/2010 | Donohoe ............... A01K 91/02 43/19 |
| 8,276,309 B2 | 10/2012 | Al-Mutairi |
| 8,499,486 B1 | 8/2013 | Thomsen |
| 8,590,204 B1 | 11/2013 | Al-Mutairi |
| 9,341,432 B1 * | 5/2016 | Wohleb ............... F16H 25/20 |
| 2004/0134115 A1 * | 7/2004 | Wyman ............... A01K 91/02 43/19 |
| 2006/0185219 A1 | 8/2006 | Giordano et al. |
| 2009/0178328 A1 | 7/2009 | Jelnicki, Jr. |
| 2010/0011652 A1 | 1/2010 | Mohr et al. |
| 2011/0005120 A1 | 1/2011 | de Koning et al. |
| 2017/0105398 A1 * | 4/2017 | Lincoln ............... A01K 91/02 |

FOREIGN PATENT DOCUMENTS

| | | |
|---|---|---|
| GB | 827107 | 2/1960 |
| JP | 2001045937 | 2/2001 |
| JP | 2010136718 | 6/2010 |
| WO | 1995017638 | 6/1995 |

* cited by examiner

FISHING LINE CASTING DEVICE

FIELD OF THE INVENTION

The present invention relates generally to fishing accessories and, more particularly, to a fishing line casting device.

BACKGROUND

Casting a fishing line can become a tedious process, even in healthy adult fishers. This process usually involves pointing the end of a fishing rod away from the direction in which the fishing line is to be cast, followed by a quick movement of the fishing rod to bring its distal end pointing generally in the direction in which the line is to be cast. This operation gives momentum to a terminal tackle attached to the fishing line, which allows the terminal tackle to pull on the fishing line while moving away from the fisher.

This conventional casting process can be difficult to perform efficiently by young children or people with reduced coordination or strength, especially when a large number of them are crowded in a small area that may be adjacent to obstacles, such as trees, among others. In this case, there is a real chance that the fishing lines of two nearby fishers will become tangled, or that the fishing line will become tangled with the obstacles when casting. Also, even when successfully cast, the terminal tackle may not be cast far enough to reach areas that are far enough from the terminal tackle of other fishers to prevent entanglement or areas where fishes are more likely to be present.

Against this background, there exists a need to provide a fishing line casting device. An object of the present invention is therefore to provide such a device.

SUMMARY OF THE INVENTION

In a broad aspect, the present invention provides a device for assisting casting and retrieval of a fishing line to which is attached a terminal tackle, the device being usable with a fishing rod including a fishing reel for stowing the fishing line, the fishing reel being selectively operable between a free spool mode wherein the fishing line can be cast and a line retrieving mode wherein the fishing line can be pulled and stowed in the fishing reel, the device being usable with a power source, the device comprising: a body, the body including a guide ramp, the guide ramp having a substantially elongated configuration and defining substantially longitudinally opposed guide ramp proximal and distal ends; a mount for mounting the body to the fishing rod; a carriage mounted to the ramp and movable longitudinally therealong, the carriage defining a tackle receiving portion for receiving the terminal tackle; a carriage biasing element operatively coupled to the carriage and to the guide ramp for biasing the carriage towards the guide ramp distal end; a power drive connectable to the power source to receive power therefrom, the power drive being operable between an unpowered mode wherein the power drive is static and a carriage pulling mode wherein the power drive is powered; a carriage pulling mechanism provided between the power drive and the carriage and operative for moving the carriage towards the ramp proximal end when the power drive is in the carriage pulling mode; a release mechanism selectively movable between engaged and disengaged configurations, wherein the release mechanism is operatively coupled to the carriage pulling mechanism and to the carriage so that when the release mechanism is in the engaged configuration, the carriage pulling mechanism is operable by the power drive to move the carriage, and, when the release mechanism is in the disengaged configuration, the carriage and carriage pulling mechanism are disengaged from each other to allow movements of the carriage along the guide ramp independently of the carriage pulling mechanism; and a controller operatively coupled to the power drive to selectively change the power drive to one of the unpowered and carriage pulling modes.

The invention may also provide a device wherein the power drive is also selectively operable in a rewinding mode wherein the power drive is also powered and the controller is operatively coupled to the power drive to also selectively change the power drive to the rewinding mode, the device further comprising a transmission element connectable to the fishing reel, the transmission element being operatively coupled to the power drive so that with the transmission element connected to the fishing reel with the fishing reel in the line retrieving mode and the power drive in the rewinding mode, the power drive drives the fishing reel to pull in and stow the fishing line.

The invention may also provide a device wherein the power drive includes an electric motor and first and second output shafts, the first output shaft being operatively coupled to the electric motor for rotating only when the power drive is in the carriage pulling mode and the second output shaft being operatively coupled to the electric motor for rotating only when the power drive is in the line retrieving mode, the carriage pulling mechanism moving the carriage towards the ramp proximal end when the first output shaft is rotated, the transmission element being operatively coupled to the second output shaft so that when the transmission element is connected to the fishing reel with the fishing reel in the line retrieving mode and the second output shaft is rotated, the fishing reel pulls in and stows the fishing line.

The invention may also provide a device further comprising first and second single direction bearings provided between the electric motor and respectively the first and second output shafts, the first and second single direction bearings only allowing rotation of the first and second output shafts by the motor in a single respective direction.

The invention may also provide a device wherein the electric motor is rotatable in first and second rotation directions opposed to each other; and the first and second single direction bearings only allow each of the first and second output shafts to be rotated by the electric motor in opposite directions so that only the first or second output shafts rotates when the electric motor is rotated respectively in the first or second rotation directions.

The invention may also provide a device wherein the transmission element includes a flexible drive shaft jointly rotatable with the second output shaft.

The invention may also provide a device wherein the carriage biasing element includes an elongated and flexible resiliently deformable element extending between the body and the carriage.

The invention may also provide a device wherein the flexible resiliently deformable element is made of an elastomeric material.

The invention may also provide a device wherein the carriage pulling mechanism includes an elongated threaded rod extending along the guide ramp and defining a rod longitudinal axis; and the carriage includes a carriage body and a threaded element mechanically coupled to the carriage body and threadedly engaging the threaded rod, the threaded rod being operatively coupled to the power drive for being rotated by the latter when the power drive is in the carriage pulling mode and the release mechanism is in the engaged configuration.

The invention may also provide a device wherein the threaded element includes an arc segment shaped threaded portion abutting against the threaded rod.

The invention may also provide a device wherein the threaded element is mounted to the carriage body and movable relative thereto between rod engaged and rod disengaged positions, wherein, in the rod engaged position, the threaded element engages the threaded rod so that rotation of the threaded rod about the rod longitudinal axis moves the threaded element along the threaded rod, and, in the rod disengaged position, the threaded element is spaced apart from the threaded rod.

The invention may also provide a device wherein the threaded element remains longitudinally fixed relative to the carriage body when moved between the rod engaged and rod disengaged positions.

The invention may also provide a device wherein the threaded element is biased towards the rod engaged position.

The invention may also provide a device wherein the release mechanism includes an actuating element for selectively moving the threaded element between the rod engaged and rod disengaged positions.

The invention may also provide a device wherein the actuating element abuts against the threaded element and is provided between the body and the threaded element; at least one of the body and the actuating element defines at least two longitudinally spaced apart ramps each defining a guiding surface, the guiding surfaces being angled relative to the rod longitudinal axis, the actuating element and body abutting against each other at the ramps; the actuating element is movable longitudinally along the body between actuating element first and second positions; and the ramps, the body and the actuating element are configured and sized so that when the actuating element moves between the actuating element first and second positions, the actuating element simultaneously moves transversally relative to the body so that when the actuating element is in the actuating element first position, the threaded element is in the rod engaged position, and, when the actuating element is in the actuating element second position, the threaded element is in the rod disengaged position.

The invention may also provide a device wherein the actuating element is biased towards the actuating element first position.

The invention may also provide a device further comprising a lever for selectively moving the actuating element between the actuating element first and second positions.

The invention may also provide a device wherein the tackle receiving element defines a cavity opening towards the guide ramp distal end for receiving at least part of the terminal tackle thereinto.

In another broad aspect, the invention provides a fishing rod, comprising: a pole; a fishing line terminated with a terminal tackle; a fishing reel mounted to the pole, the fishing line being stowable in the fishing reel, the fishing reel being selectively operable between a free spool mode wherein the fishing line can be cast and a line retrieving mode wherein the fishing line can be pulled and stowed in the fishing reel; and a fishing line casting device, the fishing line casting device including a body extending along at least part of the pole and mounted thereto, the body including a guide ramp, the guide ramp having a substantially elongated configuration and defining substantially longitudinally opposed guide ramp proximal and distal ends; a carriage mounted to the ramp and movable longitudinally therealong, the carriage defining a tackle receiving portion for receiving the terminal tackle; a carriage biasing element operatively coupled to the carriage and to the guide ramp for biasing the carriage towards the guide ramp distal end; a power drive connected to a power source to receive power therefrom, the power drive being operable between an unpowered mode wherein the power drive is static and a carriage pulling mode wherein the power drive is powered; a carriage pulling mechanism provided between the power drive and the carriage and operative for moving the carriage towards the ramp proximal end when the power drive is in the carriage pulling mode; a release mechanism selectively movable between engaged and disengaged configurations, wherein the release mechanism is operatively coupled to the carriage pulling mechanism and to the carriage so that when the release mechanism is in the engaged configuration, the carriage pulling mechanism is operable by the power drive to move the carriage, and, when the release mechanism is in the disengaged configuration, the carriage and carriage pulling mechanism are disengaged from each other to allow movements of the carriage along the guide ramp independently of the carriage pulling mechanism; and a controller operatively coupled to the power drive to selectively change the power drive to one of the unpowered and carriage pulling modes.

Advantageously, the proposed invention allows casting of the terminal tackle without requiring relatively large and quick movements of the pole.

The present application claims benefit from UK request application Number 1517075.6 filed on Sep. 26, 2016, the contents of which is hereby incorporated by reference in its entirety.

Other objects, advantages and features of the present invention will become more apparent upon reading of the following non-restrictive description of some embodiments thereof, given by way of example only with reference to the accompanying drawings.

DETAILED DESCRIPTION

The term "substantially" is used throughout this document to indicate variations in the thus qualified terms. These variations are variations that do not materially affect the manner in which the invention works and can be due, for example, to uncertainty in manufacturing processes or to small deviations from a nominal value or ideal shape that do not cause significant changes to the invention. These variations are to be interpreted from the point of view of the person skilled in the art.

Figure 1:
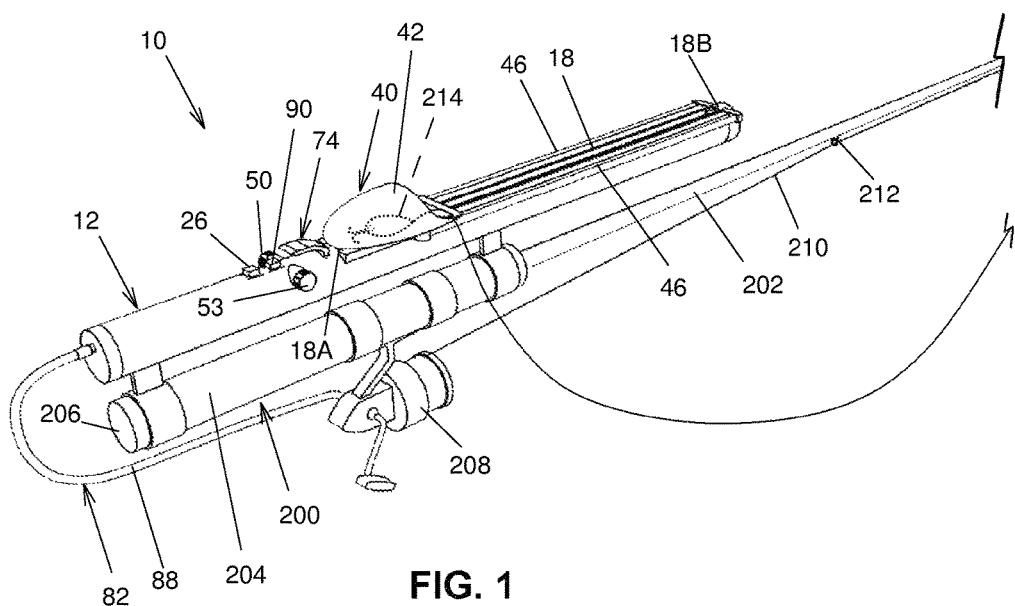
FIG. 1, in a rear end perspective view, illustrates an embodiment of a fishing line casting device, according to the present invention, here shown operatively mounted on a fishing rod assembly, the fishing line casting device being shown including a carriage thereof readily in position, ready to cast a terminal tackle, the fishing line casting device being also operative in the present embodiment for assisting in rewinding the fishing line on a fishing reel.
Figure 2:
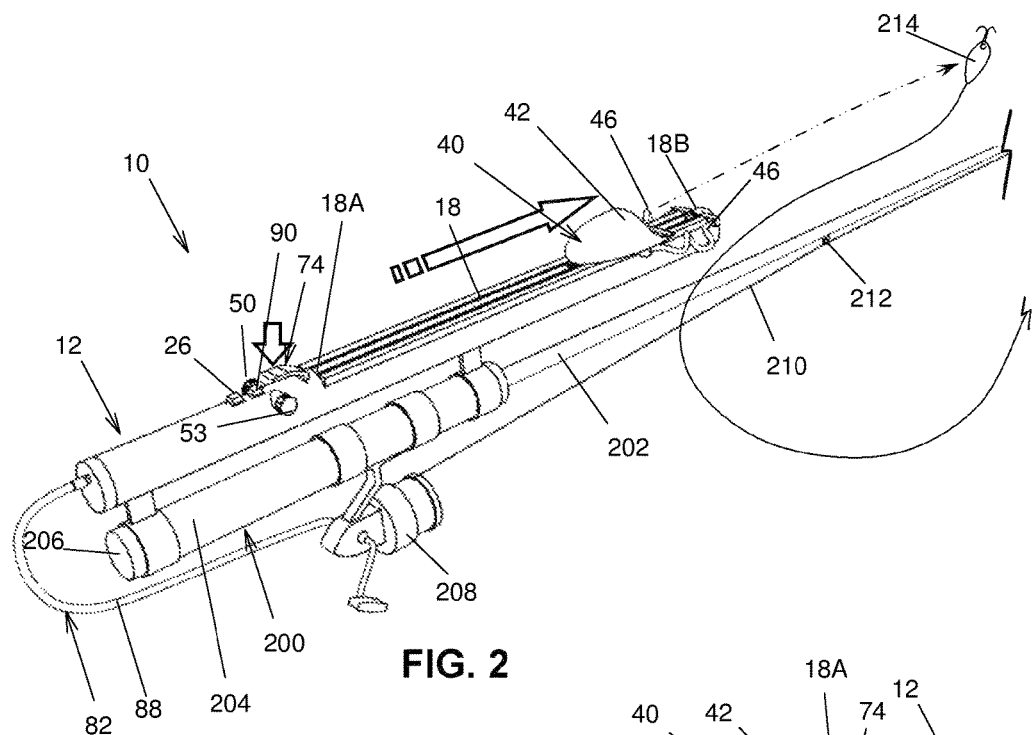
FIG. 2, in a rear end perspective view, illustrates the fishing line casting device of FIG. 1, here shown with the carriage urged toward a guide ramp distal end with the terminal tackle article propelled in a casting direction.
Figure 3:
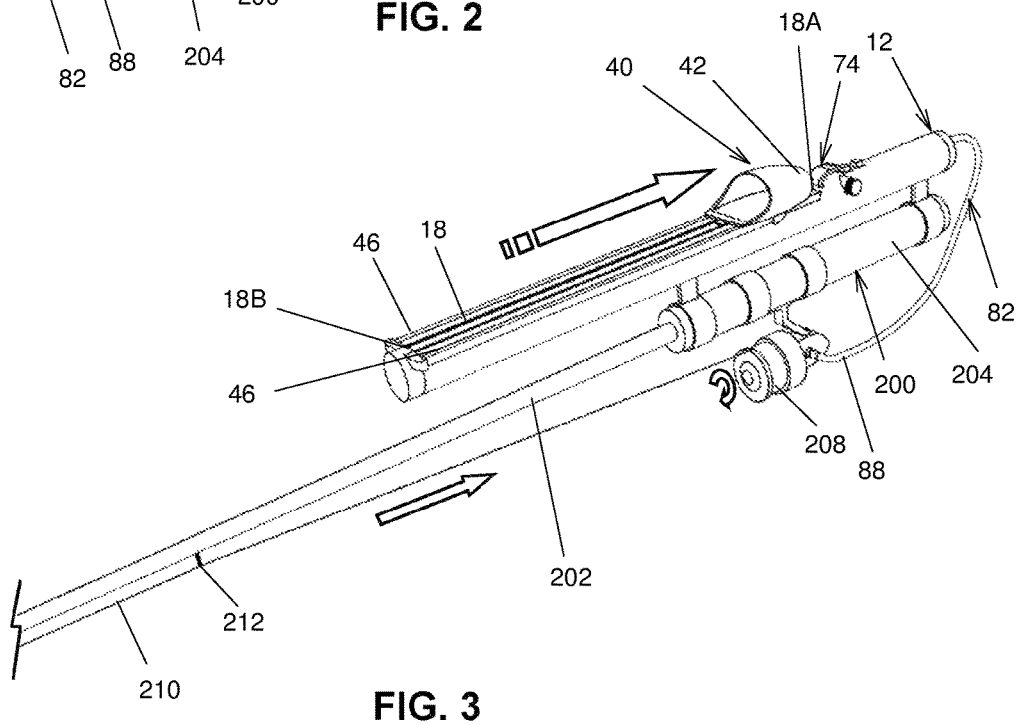
FIG. 3, in a front end perspective view, illustrates the fishing line casting device of FIG. 1, here showing the carriage being moved in position, ready for a subsequent casting of the fishing line, and a fishing reel of the fishing rod being operated for rewinding the fishing line on the line spool thereof.

FIGS. 1 to 3 inclusively illustrates various aspects of an embodiment, according to the present invention, of a fishing line casting device 10, hereinafter referenced more simply as the device 10. In some embodiments, the device 10 is also usable to assist rewinding of a fishing line after it has been cast.

The device 10 is usable with a fishing rod 200. The fishing rod 200 may typically include an elongated pole 202 defining and rod handle 204 at a proximal end 206 thereof, a fishing reel 208 attached to the rod handle 204, a fishing line 210 spooled on the fishing reel 208 for stowing the former, the fishing line 210 having an end portion thereof extending through a series of line guides 212 along the pole 202. The fishing reel 208 is selectively operable between a free spool mode wherein the fishing line 210 can be cast and a line retrieving mode wherein the fishing line 210 can be pulled and stowed in the fishing reel 208. A terminal tackle 214 is typically attached to the distal free end of the fishing line 210. Such terminal tackles are used to catch a fish and may include one or more of hooks, leaders, swivels, sinkers, floats, split rings and wire, snaps, beads, spoons, blades, spinners and clevises to attach spinner blades to fishing lures, among others.

Figure 4:
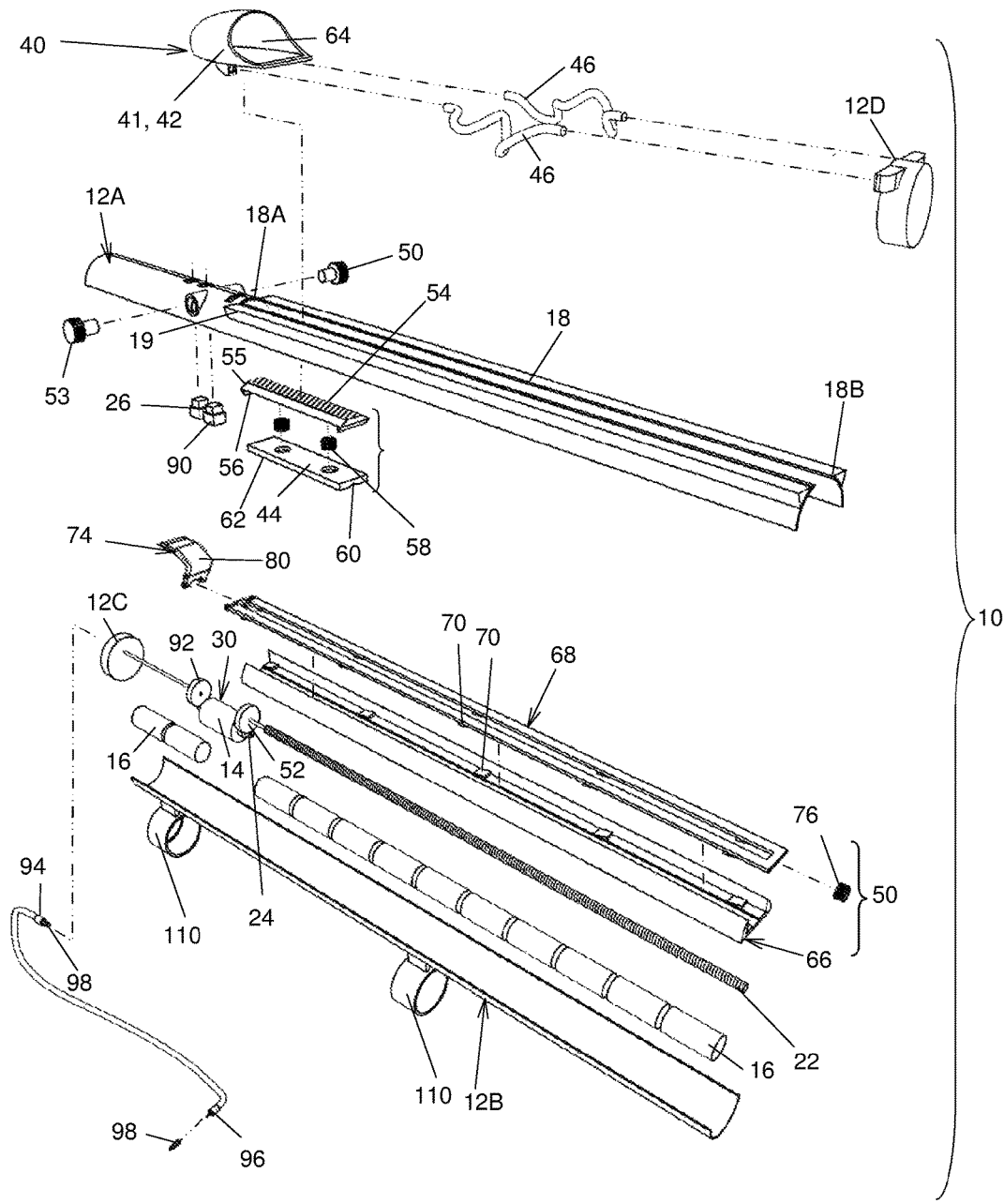
FIG. 4, in a perspective exploded view, illustrates the fishing line casting device of FIG. 1.

The device 10 includes a body 12. Referring to FIG. 4, in some embodiments and non-limitingly, the body 12 takes the form of a tubular element, which may be made of two generally semi-cylindrical halves 12A and 12B ended with end caps 12C and 12D that is for example removably attachable to the fishing rod handle 204 of the fishing rod 200 through one or more mounts 110.

The device 10 further comprises a power drive 30 mounted to the body 12. The power drive 30 is operable between an unpowered mode wherein the power drive 30 is static and a carriage pulling mode wherein the power drive 30 is powered. In some embodiments, the power drive 30 is also selectively operable in a rewinding mode wherein the power drive 30 is also powered. For example, the power drive 30 provides power in opposite directions in the rewinding and carriage pulling modes. A controller 31 (seen for example in FIG. 5) is operatively coupled to the power drive 30 to selectively change the power drive 30 to one of the unpowered and carriage pulling modes. When the power drive 30 is operable in the rewinding more, the controller 31 is operatively coupled to the power drive 30 to also selectively change the power drive 30 to the rewinding mode. In some embodiments, the power drive 30 includes an electrical motor 14 electrically coupled to a power source, for example a series of batteries 16, and the controller 31 includes a suitable control circuit 17 and controls 26, 90, 51, 53 and 48, described in further details below. The control circuit 17 can selectively provide power to the motor 14 to rotate the latter. The intended user of the device 10 operates the device 10 with the help of the controls 26, 90, 51, 53 and 48, which provide inputs to the control circuit 17 that indicate if power is to be provided to the motor 14. In some embodiments, the controls 26, 90, 51, 53 and 48 also indicate the polarity of the power provided to the motor 14, which controls the direction in which the motor 14 rotates, and the tension or amperage of this power, which controls the speed at which the motor 14 rotates.

As seen for example in FIG. 18, the body 12 defines a guide ramp 18 attached to, or otherwise integrated with, the remainder of the body 12. The guide ramp 18 has a substantially elongated configuration and defines substantially longitudinally opposed guide ramp proximal end 18A positioned typically proximally the fishing rod handle 204, and guide ramp distal end 18B provided away from a user of the fishing rod 200. For example, the guide ramp is formed in the semi-cylindrical half 12A.

The device 10 further includes a carriage 40. The carriage 40 is slidably engaged along the guide ramp 18 so as to be movable longitudinally therealong between the guide ramp proximal end 18A and guide ramp distal end 18B. The carriage 40 may be engaged with the guide ramp 18 in a dovetail joint configuration so that only longitudinal movements of the carriage 40 along the guide ramp 18 are possible, and not transversal ones. In the embodiment of the invention shown in the drawings, the carriage 40 is slidable along the guide ramp 18. However, in other embodiments, the carriage 40 could include rollers rollable along the guide ramp 18 or be otherwise movable therealong. The carriage 40 defines a tackle receiving portion 42 for receiving the terminal tackle 214.

Figure 8:
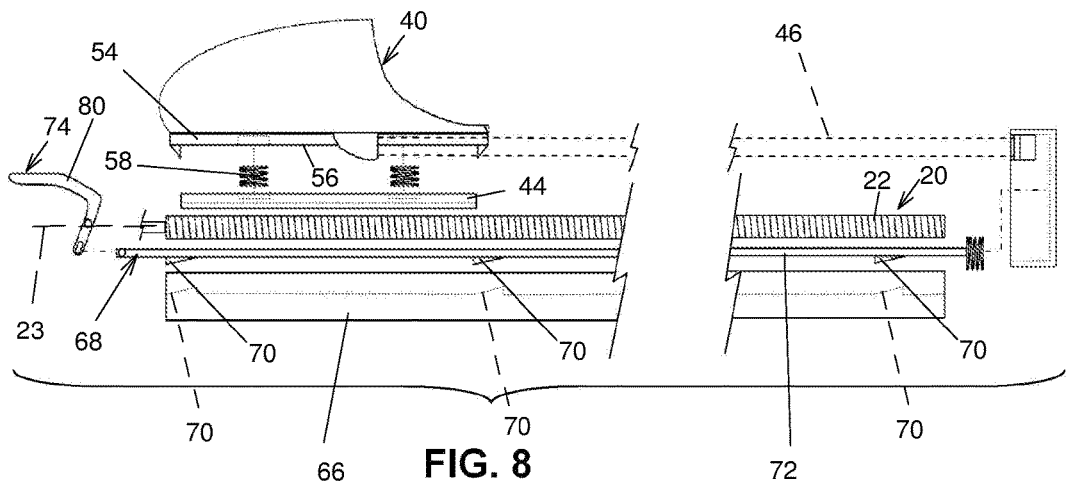
FIG. 8, in a side elevation view with parts removed, illustrates the fishing line casting device of FIG. 1.

The device 10 further comprises a carriage biasing element 46 operatively coupled to the carriage 40 and the guide ramp 18 for biasing the carriage 40 toward the guide ramp distal end 18B. Also, with reference to FIGS. 8 and 9, a carriage pulling mechanism 20 is provided between the power drive 30 and the carriage 40 and is operative for moving the carriage 40 towards the ramp proximal end 18A when the power drive 30 is in the carriage pulling mode. For example, as seen in FIG. 8, the carriage pulling mechanism 20 includes an elongated threaded rod 22 defining a rod longitudinal axis 23 and rotatably mounted on the body 12 to be rotatable about the rod longitudinal axis 23. The threaded rod 22 extends parallelly substantially the whole length of the guide ramp 18. The threaded rod 22 has an end thereof operatively coupled to a first output shaft 24 of the power drive 30 to be rotatable thereby.

The carriage pulling mechanism 20 is controlled through a control in the form of a first input switch 26 electrically coupled to the power drive 30 through the control circuit 17 for selectively rotating the threaded rod 22 in a threaded rod tensioning direction when the first input switch 26 is depressed.

Figure 9:
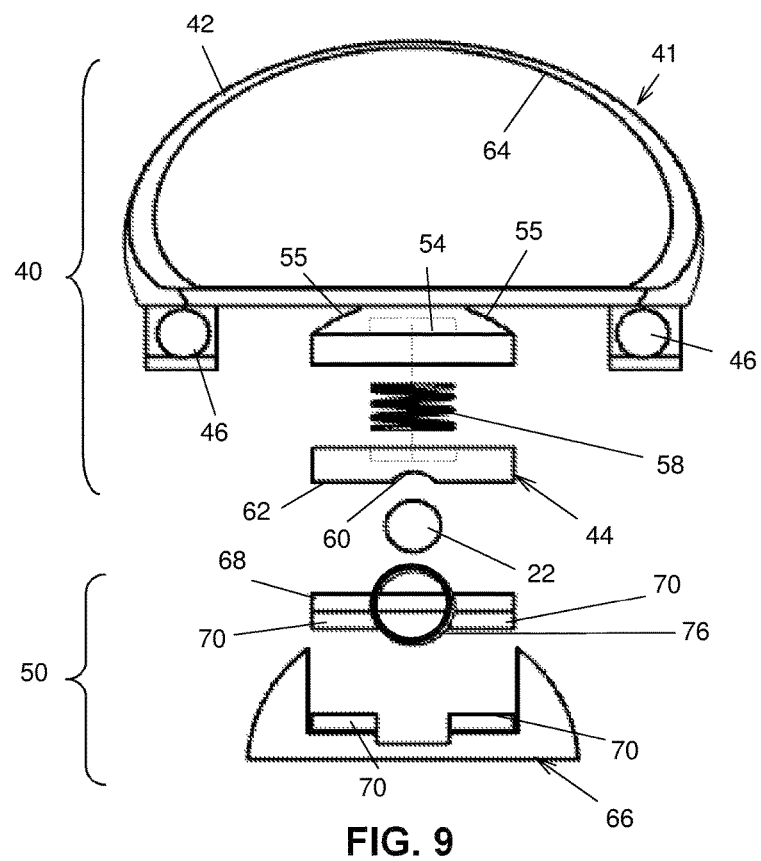
FIG. 9, in a front elevational exploded view respectively, illustrates the carriage and part of a release mechanism and of a carriage pulling mechanism all part of the fishing line casting device of FIG. 1.

Referring to FIG. 9, the carriage 40 includes a carriage body 41 defining a tackle receiving portion 42 configured and sized for releasably receiving the terminal tackle 214 (not shown in FIG. 9). The carriage 40 further includes a carriage coupling element 44 mechanically coupled to the carriage body 41. The carriage coupling element 44 is a threaded element and is movable between a rod engaged position (seen in FIG. 10) and a rod disengaged position (seen in FIG. 11). In the rod engaged position, the carriage coupling element 44 is threadedly engaged with the threaded rod 22 so that rotation of the threaded rod 22 about the rod longitudinal axis 23 moves the carriage coupling element 44 along the threaded rod 22. In the rod disengaged position, the carriage coupling element 44 is threadedly disengaged from the threaded rod 22, which allows the carriage 40 to slide along the guide ramp 18 independently of movements of the threaded rod 22.

Figure 10:
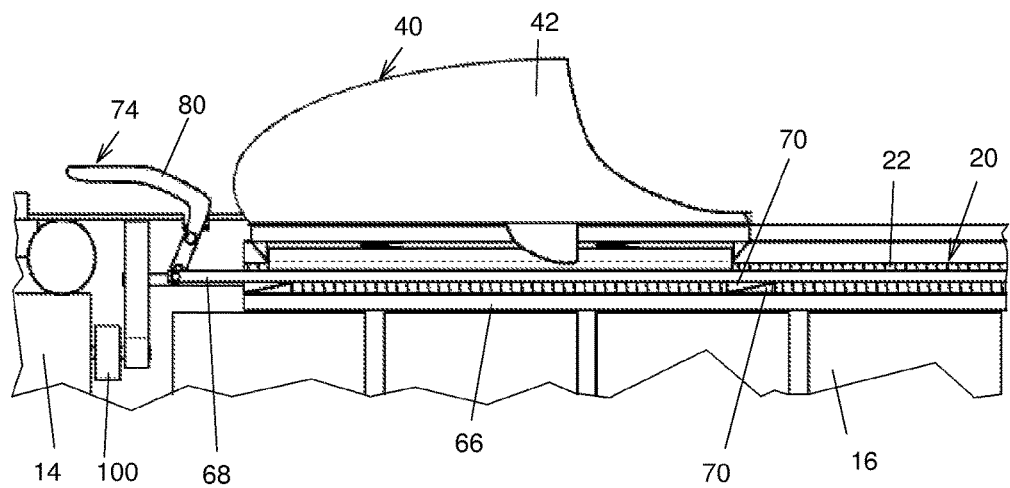
FIG. 10, in a side elevational partial cut away view, illustrates the carriage, the carriage pulling mechanism and the release mechanism of FIG. 9, wherein the release mechanism is in an engaged configuration and the carriage engages the carriage pulling mechanism.
Figure 11:
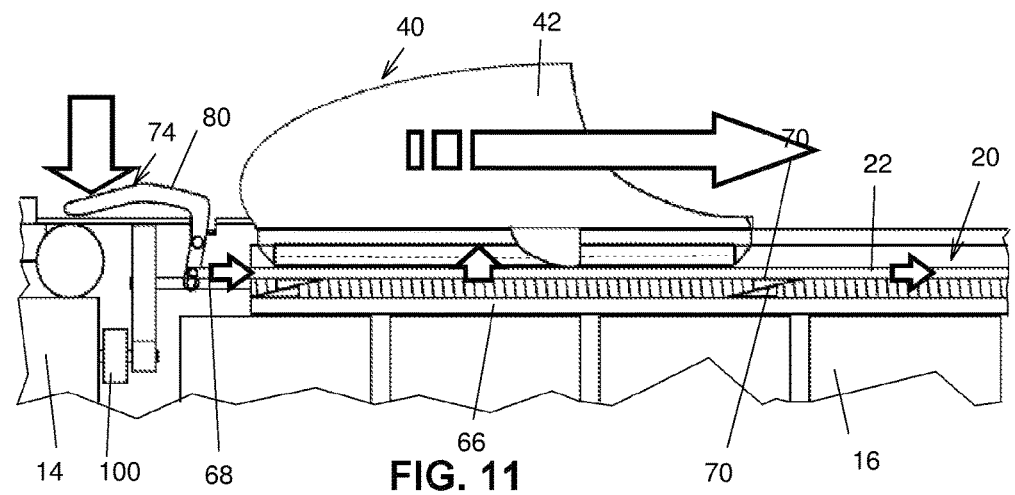
FIG. 11, in a side elevational partial cut away view, illustrates the carriage, the carriage pulling mechanism and the release mechanism of FIG. 9, wherein the release mechanism is in a disengaged configuration and the carriage is disengaged from the carriage pulling mechanism.

Returning to FIG. 9, the device 10 further comprises a release mechanism 50 selectively movable between engaged and disengaged configurations (seen respectively in FIGS. 10 and 11). The release mechanism 50 is operatively coupled to the carriage pulling mechanism 20 and to the carriage 40 so that when the release mechanism 50 is in the engaged configuration, the carriage pulling mechanism 20 is operable by the power drive 30 to move the carriage 40, and, when the release mechanism 50 is in the disengaged configuration, the carriage 40 and carriage pulling mechanism 20 are disengaged from each other to allow movements of the carriage 40 along the guide ramp 18 independently of the carriage pulling mechanism 20. For example, the release mechanism 50 is operatively mounted between the body 12 and the carriage coupling element 44. The release mechanism 50 is user selectively movable between the engaged configuration, wherein the carriage coupling element 44 is in the rod engaged position relative to the threaded rod 22, and the disengaged configuration wherein the carriage coupling element 44 is in the rod disengaged position relative to the threaded rod 22.

Thus, with the fishing reel 208 in a free spool mode for casting and the terminal tackle 214 releasably engaged in the tackle receiving portion 42, a user may selectively operate the carriage pulling mechanism 20 through the first input switch 26, for positioning the carriage 40 at a user selected position along the guide ramp 18 with the release mechanism 50 in the engaged configuration.

Subsequently, the user may move the release mechanism 50 to the disengaged configuration so as to threadedly disengage the carriage coupling element 44 from the threaded rod 22 and, thus, allow the carriage 40 to propel the terminal tackle 214 in a casting direction with a biasing force applied by the carriage biasing element 46. For example, the biasing force linearly increases with the distance between the carriage 40 and the guide ramp distal end 18B, which allows adjustment of this biasing force by selecting a suitable position of the carriage 40 along the guide ramp 18 when the carriage 40 is released.

The first input switch 26 is for example a user actuated momentary push-bottom switch. The momentary push-bottom switch is suitably electrically coupled to the power drive 30, through the control circuit 17, for enabling the rotation of the threaded rod 22 in the threaded rod tensioning direction so as to move the carriage 40 toward the guide ramp proximal end 18A.

In some embodiments, as would be obvious to someone familiar with small power tools, the device 10 may further include a carrier detecting switch 48 (seen in FIG. 5) suitably positioned adjacent each of the guide ramp proximal and distal ends 18A and 18B. These carrier detecting switches 48 may be suitably electrically coupled to the power drive 30, through the control circuit 17, for detecting the presence of the carriage 40 at each end of the guide ramp 18 and, hence, automatically initiate an operation and stopping of the carriage pulling mechanism 20 when the carriage 40 is at such locations.

Furthermore, the carriage pulling mechanism 20 may further include a manually operable tension speed variable potentiometer 51, part of the controls, suitably electrically coupled to the power drive 30 through the control circuit 17 for allowing a user to selectively adjust the speed at which the threaded rod 22 is rotated and, thus, the speed at which the carriage 40 is moved along the guide ramp 18 toward the guide ramp proximal end 18A.

In some embodiments, the first input switch 26 and the tension speed variable potentiometer 51 may be represented by a two-way potentiometer and electric switch combination (not shown in the drawings). This two-way potentiometer and electric switch combination typically has a middle OFF position wherein the switch contact is open and, hence, inhibit the carriage pulling mechanism 20 from operating, and opposed directions two-way potentiometers wherein the contact is closed, or ON, and allowing a user to rotate the threaded rod 22 in a forward variable speed, or tensioning direction, or a reverse variable speed, or loosening direction of the carriage 40. Other well known configurations and/or combinations of the input switch means 26 and tension speed variable potentiometer 51, for operating the carriage pulling mechanism 20, are also possible.

As seen for example in FIG. 4, the carriage pulling mechanism 20 may also include includes a first gear assembly 52 operatively coupled between the first output shaft 24 of the power drive 30 and the distal end of the threaded rod 22. For example, the first gear assembly 52 may have a suitable gear ratio for allowing the power drive 30 to move the carriage 40 along the threaded rod 22, from the guide ramp distal end 18B to the guide ramp proximal end 18A, where a maximum biased force is applied by the carriage biasing element 46 on the carriage 40 towards the guide ramp distal end 18B.

FIGS. 4, 8 and 9 illustrate a non-limiting example of the carriage 40 and the manner in which the carriage 40 is mounted to the guide ramp 18 and engages the threaded rod 22. However, alternative structures can be used for the same purposes. In this embodiment, the carriage body 41 further includes a ramp engaging element 54. The ramp engaging element 54 defines for example a pair of laterally extending grooves 55 in which a suitably shaped portion 19 of the guide ramp (seen for example in FIG. 4) is inserted so that the carriage 40 is prevented from moving laterally relative to the guide ramp 18, while allowing the carriage 40 to move longitudinally along the guide ramp 18. The groove 55 and portion 19 thus have complementarily shaped transversal configurations. The ramp engaging element 54 has a length dimension that is substantially shorter than the guide ramp 18 and is longitudinally slidably engaged therewith. The ramp engaging element 54 defines a ramp engaging element recess 56 opening toward the threaded rod 22, and is shaped and sized for slidably receiving therein in a snug fit relation the carriage coupling element 44 so that the threaded portion thereof faces the threaded rod 22. In such embodiments, the carriage coupling element 44 remains longitudinally fixed relative to the carriage body when moved between the rod engaged and rod disengaged positions. The carriage coupling element 44 is movable in the ramp engaging element recess 56 so that the distance between the carriage coupling element 44 and the threaded rod 22 can be varied.

The carriage 40 further includes a coupling member biasing element 58 operatively coupled between the ramp engaging element 54 and the carriage coupling element 44 for biasing the carriage coupling element 44 towards the rod engaged position. The coupling member biasing element 58 is configured and sized for abuttingly urging the carriage coupling element 44 in the rod engaged position against the threaded rod 22, so as to be biasingly threadedly engaged therewith when the release mechanism 50 is in the engaged configuration. As best exemplified in FIGS. 4 and 8, the coupling member biasing element 58 may be represented by a pair of suitably configured compression coil springs. Other types of known biasing elements are also possible.

The carriage coupling element 44 defines an arc segment shaped threaded portion, for example in the form of a threaded groove 60 extending longitudinally throughout and substantially perpendicularly inwardly relative to a surface portion 62 thereof that is oriented towards the threaded rod 22. The threaded groove 60 is suitably sized and shaped for threadedly conforming to a longitudinal side portion of the threaded rod 22 so as to longitudinally parallelly engage therewith.

As illustrated in FIGS. 1, 3, 4 and 9, the tackle receiving portion 42 is for example an open receptacle attached to the ramp engaging element 54. The open receptacle is suitably sized and shaped for freely receiving the terminal tackle 214. Furthermore, the open receptacle defines a receptacle opening 64 oriented substantially parallelly relative to the guide ramp 18 and towards the guide ramp distal end 18B.

Alternatively, the tackle receiving portion 42 may be represented by a relatively small stem or hook-like member (not shown in the drawings) extending from the carriage 40 and having a distal free end thereof oriented distally substantially in a same direction as the guide ramp distal end 18B.

Now referring more particularly to FIGS. 4, and 8 to 11, there is shown an example of the release mechanism 50. As with the carriage 40, alternative release mechanisms are also usable. The embodiment of the release mechanism 50 shown in the drawings includes an actuating element 68 for selectively moving the threaded element 44 between the rod engaged and rod disengaged positions. The actuating element 68 works in cooperation with a body release portion 66 part of the body 12.

The body release portion 66 is represented for example by a substantially elongated member rigidly attached to, or integrated with, the remainder of the body 12, and extends longitudinally parallelly substantially the whole length of the guide ramp 18.

The actuating element 68 abuts against the carriage coupling element 44 and is provided between the body 12, and more specifically the body release portion 66, and the carriage coupling element 44. The actuating element 68 has an elongated configuration, for example substantially equivalent in length to the body release portion 66 and is longitudinally parallelly positioned relative thereto. The actuating element 68 is movable longitudinally along the body 12 between actuating element first and second positions. The actuating element 68 is closer to the guide ramp proximal end 18A in the actuating element first position.

At least one of the body 12 and the actuating element 68 defines at least two longitudinally spaced apart ramps each defining a guiding surface, the guiding surfaces being angled relative to the rod longitudinal axis 23. The actuating element 68 and body 12 abut against each other at the ramps. In the embodiment shown in the drawings, both the body 12, in the body release portion 66, and the actuating element define ramps, but ramps defined in only one of them is within the scope of the invention, this ramp then abutting against a suitably shaped portion of the body 12 or actuating element, such as a pin.

More specifically, the body release portion 66 and the actuating element 68 each define ramps in the form of oppositely facing paired protrusions 70. The paired protrusions 70 having each a substantially isosceles right triangle configuration in a longitudinal side cross-section that are each oriented in an opposite longitudinal direction relative to one another. The guiding surfaces are the sides of the triangles that abut against each other.

The body release portion 66 and the actuating element 68 are configured and sized so that when the actuating element 68 moves between the actuating element first and second positions, the actuating element 68 simultaneously moves transversally relative to the body 12, due to the ramps formed by the protrusions 70, so that when the actuating element 68 is in the actuating element first position, the carriage coupling element 44 is in the rod engaged position, and, when the actuating element 68 is in the actuating element second position, the carriage coupling element 44 is in the rod disengaged position. In some embodiments, the body release portion 66 and the actuating element 68 extend on each diametrically opposed longitudinal sides of the threaded rod 22 for a more balanced distribution of the frictional and biasing forces involved in the device 10.

The release mechanism 50 further includes a release trigger 74 in the form of a lever. The release trigger 74 is operatively coupled to the actuating element 68 for user selectively moving the actuating element 68 longitudinally relative to the body release portion 66 between the actuating element first position wherein the actuating element 68 is parallelly the closest relative to the body release portion 66, and wherein the carriage coupling element 44 is biasingly threadedly engaged with the threaded rod 22, and the actuating element second position wherein the actuating element 68 is parallelly the farthest relative to the body release portion 66, and wherein the carriage coupling element 44 is threadedly disengaged from the threaded rod 22, thus allowing the carriage coupling element 44 to longitudinally slide along the actuating element.

The release mechanism 50 may also include a release mechanism biasing element 76 suitably configured and sized for biasingly urging the actuating element 68 towards the actuating element first position so as to have the release mechanism 50 in the engaged configuration by default.

Figure 6:
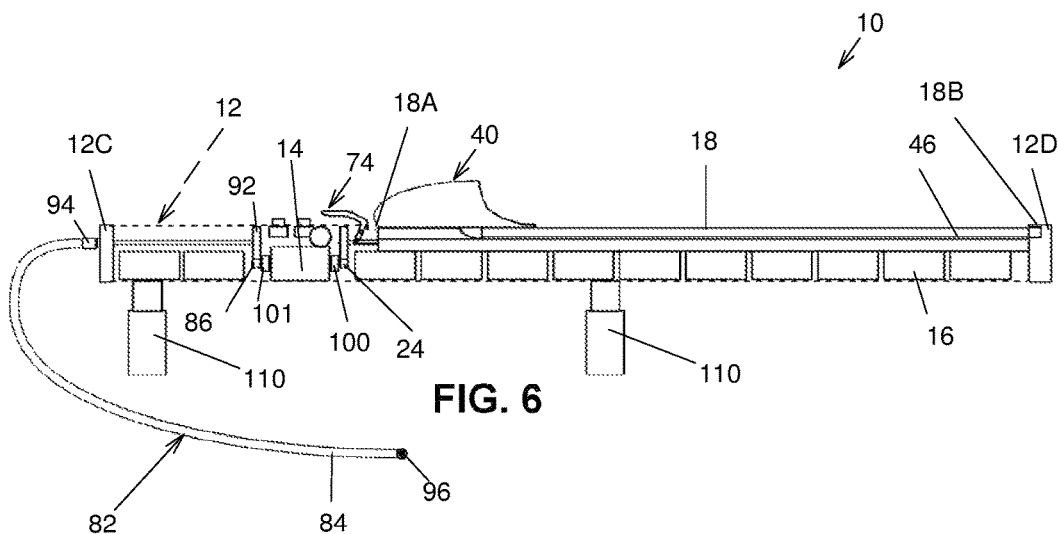
FIG. 6, in a side elevational view, illustrates the fishing line casting device of FIG. 1, here shown with a body thereof in transparent view.
Figure 7:
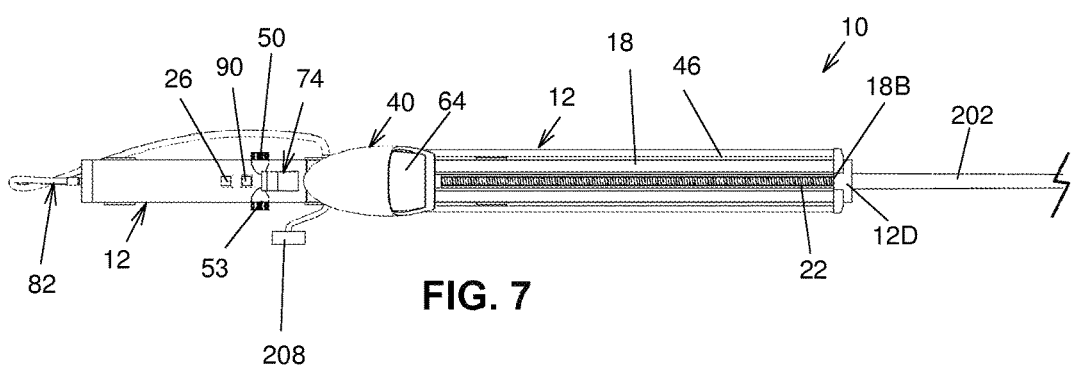
FIG. 7, in a top plan view, illustrates the fishing line casting device of FIG. 1.

For example, as best illustrated in FIGS. 4, 6 and 8, the release trigger 74 is a pivotable lever member pivotably at a pivot location intermediate its two ends, mounted substantially adjacent the guide ramp proximal end 18A and suitably adapted to selectively move the actuating element 68 from the actuating element first position to the actuating element second position thereof when a thumb portion 80 of the pivotable lever member is pressed on by a user.

Thus, as exemplified in sequence views in FIGS. 10 and 11 respectively, by pressing on the thumb portion 80 of the pivotable lever member, the actuating element 68 is pushed distally and towards the carriage 40 due to the rising ramp effect of the oppositely facing paired protrusions 70 against one another which, in turn, moves the carriage coupling element 44 away from the threaded rod 22 in the rod disengaged position relative thereto. Hence, the carriage 40 is biasingly urged toward the guide ramp distal end 18B by the carriage biasing element 46.

Alternatively, as would be obvious to someone familiar with small solenoid operated tools, the release trigger 74 may be represented by a solenoid and push button switch combination (not shown in the drawings) that are suitably electrically coupled to an electrical source of the power drive 30 and suitably adapted for moving the actuating element 68.

It is also contemplated that an additional carriage coupling element 44 and release mechanism 50 may positioned on an oppositely facing longitudinal side of the threaded rod 22, relative to the carriage 40, with a suitably adapted trigger 74 for simultaneously activating both release mechanisms 50 in an opposed jaw configuration along the threaded rod 22. Thus, this more robust design may allow the carriage 40 to be biased with relatively strong carriage biasing element 46.

As seen for example in FIGS. 1 to 3, the carriage biasing element 46 is for example represented by at least one elongated and flexible resiliently deformable element extending between the body 12 and the carriage 40. In a specific embodiment of the invention, the carriage biasing element 46 includes at least one tension elastomeric link member having one end attached to the carriage 40 and another end attached substantially adjacent the guide ramp distal end 18B. Alternatively, the carriage biasing element 46 may be represented by at least one compression spring element (not shown in the drawings) having one end attached to the carriage 40 and another end attached adjacent the guide ramp proximal end 18A, among other possibilities. Other known types of biasing element and equivalent biasing element configurations are also possible between the carriage 40 and the guide ramp 18.

In some embodiments, the device 10 further comprises a rewinding mechanism 82 for user selectively rewinding the fishing line 210 on the fishing reel 208. However, the rewinding mechanism 82 may be omitted from the device 10 in other embodiments. The rewinding mechanism 82 includes a transmission element 84 connectable to the fishing reel 208, the transmission element 84 being operatively coupled to the power drive 30 so that when the transmission element 84 is connected to the fishing reel 208 with the fishing reel 208 in the line retrieving mode and the power drive 30 is in the rewinding mode, the power drive 30 drives the fishing reel 208 to pull in and stow the fishing line 210.

In this embodiment, with reference to FIG. 6, a single electric motor 14 may be used to operate the rewinding mechanism 82 and the carriage pulling mechanism 20. To that effect, the power drive 30 includes the first output shaft 24 and a second output shaft 86. The first output shaft 24 is operatively coupled to the electric motor 14 for rotating only when the power drive 30 is in the carriage pulling mode and the second output 86 shaft is operatively coupled to the electric motor 14 for rotating only when the power drive 30 is in the line retrieving mode. The carriage pulling mechanism 20 moves the carriage 40 towards the guide ramp proximal end 18A when the first output shaft 24 is rotated. The transmission element 84 is operatively coupled to the second output shaft 86 so that when the transmission element 84 is connected to the fishing reel 208 with the fishing reel 208 in the line retrieving mode and the second output shaft 86 is rotated, the fishing reel 208 pulls in and stows the fishing line 210.

Figure 5:
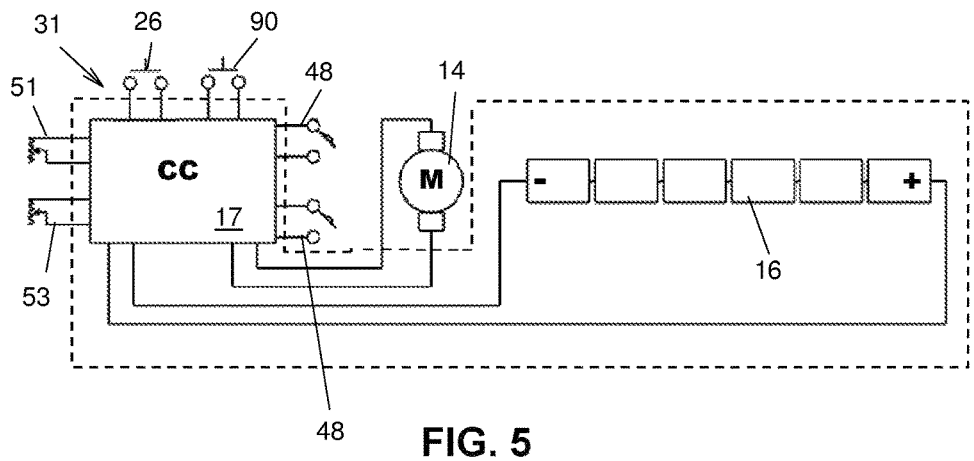
FIG. 5, in a schematic view, illustrates an embodiment of a power drive to which is electrically coupled a controller including input switches and variable potentiometers.

The transmission element 84 is operative for transmitting the rotation of the second output shaft 86 to the fishing reel 208 and as such is operatively coupled to the second output shaft 86 and to the fishing reel 208, as best illustrated in FIG. 3 for transmitting this rotation. The rewinding mechanism 82 is operated by a control in the form of a second input switch 90 electrically coupled to the power drive 30 and to the control circuit 17 (as seen in FIG. 5) for selectively rotating the transmission element 84 in a reel rewinding direction.

Referring to FIG. 6, the rewinding mechanism 82 may also include a second gear assembly 92 operatively coupled between the second output shaft 86 of the power drive 30 and the input shaft of the transmission element 84. The second gear assembly 92 has a suitable gear ratio for allowing the power drive 30 to rewind the fishing line 210 on the fishing reel 208 while a fish having up to a predetermined maximum fish weight and strength has caught the terminal tackle 214.

In a specific embodiment of the invention, the transmission element may take the form of a flexible drive shaft jointly rotatable with the second output shaft 86. The flexible drive shaft may have its input end 94 and output end 96 removably coupled to the power drive 30 and the handle shaft distal end 209 of the fishing reel 208 respectively, through suitably configured and sized magnetic hexagonal coupling bit 98, seen in FIG. 4.

The magnetic hexagonal coupling bit 98 interfacing the flexible drive shaft with the handle shaft distal end 209 of the fishing reel 208 has one end having an hexagonal configuration for engaging the compatibly shaped socket at the distal end of the flexible shaft. The opposed end of this same magnetic hexagonal coupling bit 98 has a relatively small threaded screw configuration for threadedly engaging a longitudinally inwardly extending threaded bore typically found at the handle shaft distal end 209 of most brands of fishing reels 208 available on the market.

Advantageously, a plurality of magnetic hexagonal coupling bits 98 each having a different size and thread configuration are provided with the device 10 for compatibly interfacing with the specific handle shaft distal end 209 of the most common brands of fishing reel 208 available on the market. Depending on the winding direction of the fishing reel 208, a thread lock cement may be required to secure threaded end of the bit 98 in the threaded bore of the handle shaft distal end 209.

Furthermore, it is to be noted that the transmission element 84 and the second output shaft 86 of the power drive 30 may be coupled to one another at another suitable position along the body 12 than through the end portion thereof that is closest to the user of the device 10, as illustrated in the drawings.

For example, as would be obvious to someone familiar with small geared power tools, the device 10 may comprise a suitable T-shaped gear box (not shown in the drawings) having an input shaft and two transversally disposed output shafts. Thus, a user may selectively couple the flexible drive shaft on either lateral sides of the body 12 for accommodating a left hand or a right hand configured fishing reel 208.

The second input switch 90, likewise the first input switch 26, is may be a user actuated momentary push-bottom switch for allowing a user to selectively activate the rewinding mechanism 82. The momentary push-bottom switch is suitably electrically coupled to the power drive 30 through the control circuit for enabling the rotation of the rewinding mechanism 82.

Furthermore, likewise the carriage pulling mechanism 20, the rewinding mechanism 82 may further be operable with a manually operable tension speed variable potentiometer 53 suitably electrically coupled to the power drive 30 through the control circuit 17 for allowing a user to selectively adjust the speed at which the transmission element 84 is rotated in the rewinding direction and, thus, the speed at which fishing line 210 is rewound back on the line spool of the fishing reel 208.

Also likewise the carriage pulling mechanism 20, advantageously, the second input switch 90 and the rewinding speed variable potentiometer 53 may be represented by a two-way potentiometer and electric switch combination (not shown in the drawings), thus allowing with only a thumb of the user to selectively rewind, as well as to unwind, at least a little, the fishing line 210 on the fishing reel 208, as it is sometimes required in certain styles of sport fishing. Other well known configurations and/or combinations of the input switch 90 and tension speed variable potentiometer 53, for operating the rewinding mechanism 82, are also possible.

Referring to FIG. 5, the control circuit 17 is electrically coupled to at least one of the input switches 26 and 90, to the electrical power source, for example the batteries 16, and to the electric motor 14. The control circuit 17 is suitably adapted for suitably powering the electric motor 14 with the electrical power source according to the electrical state of the input switches 26 and 90.

As would be obvious to someone familiar with control circuits, the control circuit 17 may be represented by an analog circuit or comprising as its main component an integrated circuit having suitable analog input ports, analog output ports and digital input and output ports (I/O ports) for a more versatile control.

In some embodiments of the invention, as illustrated in FIGS. 4 and 6 and mentioned hereinabove, the power drive 30 includes a single electric motor 14 having a motor drive shaft. The motor drive shaft has shaft portions thereof extending oppositely at each end of the single electric motor 14, with each oppositely extending shaft portions individually representing the first and the second output shaft 24 and 86 respectively. As best illustrated in FIG. 6, each one of the oppositely extending shaft portions of the motor 14 is interfaced with a respective single direction bearing 100 and 101. A single direction bearing 100 and 101 is a bearing that allows transmission of torque from an input portion to an output portion of the bearing when the input portion rotates in one direction and allowing rotation of the input portion independently from the output portion when rotating in the opposite direction. Each one of the single direction bearings 100 and 101 is configured to engage a rotation of their respective output shaft portion in a single direction that is opposite to the other shaft portion.

More specifically, the electric motor 14 is rotatable in first and second rotation directions opposed to each other. The first and second single direction bearings 100 and 101 are provided between the electric motor 14 and respectively the first and second output shafts 24 and 86. The first and second single direction bearings 100 and 101 only couple each of the first and second output shafts 24 and 86 to the electric motor 14 to be rotated thereby in a single respective direction. The first and second single direction bearings 100 and 101 only allow each of the first and second output shafts 24 and 86 to be rotated in opposite directions so that only the first or second output shaft 24 or 86 rotates when the electric motor 14 is rotated respectively in the first or second rotation directions.

Thus, with the use of two single direction bearings 100 and 101 operatively mounted at each end of a single electric motor 14, and the first input switch 26 and the second input switch 90 each suitably electrically coupled to the power drive 30 so as to selectively operate the single electric motor 14 in opposite directions. Hence, each one of the carriage pulling mechanism 20 and the rewinding mechanism 82 may be exclusively operated without requiring an additional auxiliary gearbox component to manage their individual operation.

In some other embodiments (not shown in the drawings), the electric motor drive assembly includes a first electric motor 14 having a first output shaft 24, and a second electric motor 14 having a second output shaft 86. Thus the carriage pulling mechanism 20 and the rewinding mechanism 82 may be selectively operated individually as well as simultaneously.

The power source may be represented by at least one, but typically a plurality of replaceable batteries, a plurality of rechargeable battery and a recharge power port combination as illustrated in the drawings, or an electrical power port to which is removably connected an external electrical power source.

Furthermore, the body 12 may have a diameter substantially equivalent to the diameter of the fishing rod handle 204, and may be attached in a parallelly spaced apart relation relative thereto and diametrically opposite the fishing reel 208. Advantageously, the body 12 may define at least one inner waterproof compartment in which are positioned the power drive 30, with the input switches 26 and 90 being represented by suitable waterproof electrical components.

In some embodiments, the mount 110 takes the form of one or more clamps for removably attaching the device 10 to the fishing rod handle 204. However, any other manner of attaching the device 10 to the fishing rod 200 is within the scope of the invention. In some embodiments, the device 10 is an integral part of the fishing rod 200 (not shown in the drawings). For example, the body is embedded in the fishing rod handle 204.

In some embodiments of the invention, the device 10 may only comprise the carriage pulling mechanism 20, only the rewinding mechanism 82, or both. Furthermore, each embodiment may be advantageously used for other purposes than sport fishing.

The components included in the various embodiments of the present invention described above are typically made of sufficiently rigid, yet relatively light materials typically used in the manufacture of sport fishing equipment. For example, such materials may include rigid plastic, aluminum, a suitable metal alloys, a carbon fibre composite material, or a combination thereof.

Furthermore, the various embodiments of the present invention described above may be suitably sized and configured to suit a particular calibre of fish to catch, depending on their weight and combativeness. For example, a relatively small and light device 10 for amateur sport fishing, a high quality device 10 for more experienced anglers having a lifelong passion for their sport, and a more robust device 10 for high sea sport fishing.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A device for assisting casting and retrieval of a fishing line to which is attached a terminal tackle, the device being usable with a fishing rod including a fishing reel for stowing the fishing line, the fishing reel being selectively operable between a free spool mode wherein the fishing line can be cast and a line retrieving mode wherein the fishing line can be pulled and stowed in the fishing reel, the device being usable with a power source, the device comprising:
a body, the body including a guide ramp, the guide ramp having a substantially elongated configuration and defining substantially longitudinally opposed guide ramp proximal and distal ends;
a mount for mounting the body to the fishing rod;
a carriage mounted to the ramp and movable longitudinally therealong, the carriage defining a tackle receiving portion for receiving the terminal tackle;
a carriage biasing element operatively coupled to the carriage and to the guide ramp for biasing the carriage towards the guide ramp distal end;
a power drive connectable to the power source to receive power therefrom, the power drive being operable between an unpowered mode wherein the power drive is static and a carriage pulling mode wherein the power drive is powered;
a carriage pulling mechanism provided between the power drive and the carriage and operative for moving the carriage towards the ramp proximal end when the power drive is in the carriage pulling mode;
a release mechanism selectively movable between engaged and disengaged configurations, wherein the release mechanism is operatively coupled to the carriage pulling mechanism and to the carriage so that when the release mechanism is in the engaged configuration, the carriage pulling mechanism is operable by the power drive to move the carriage, and, when the release mechanism is in the disengaged configuration, the carriage and carriage pulling mechanism are disengaged from each other to allow movements of the carriage along the guide ramp independently of the carriage pulling mechanism; and
a controller operatively coupled to the power drive to selectively change the power drive to one of the unpowered and carriage pulling modes.

2. The device as defined in claim 1, wherein the power drive is also selectively operable in a rewinding mode wherein the power drive is also powered and the controller is operatively coupled to the power drive to also selectively change the power drive to the rewinding mode, the device further comprising a transmission element connectable to the fishing reel, the transmission element being operatively coupled to the power drive so that with the transmission element connected to the fishing reel with the fishing reel in the line retrieving mode and the power drive in the rewinding mode, the power drive drives the fishing reel to pull in and stow the fishing line.

3. The device as defined in claim 2, wherein the power drive includes an electric motor and first and second output shafts, the first output shaft being operatively coupled to the electric motor for rotating only when the power drive is in the carriage pulling mode and the second output shaft being operatively coupled to the electric motor for rotating only when the power drive is in the line retrieving mode, the carriage pulling mechanism moving the carriage towards the ramp proximal end when the first output shaft is rotated, the transmission element being operatively coupled to the second output shaft so that when the transmission element is connected to the fishing reel with the fishing reel in the line retrieving mode and the second output shaft is rotated, the fishing reel pulls in and stows the fishing line.

4. The device as defined in claim 3, further comprising first and second single direction bearings provided between the electric motor and respectively the first and second output shafts, the first and second single direction bearings only allowing rotation of the first and second output shafts by the motor in a single respective direction.

5. The device as defined in claim 4, wherein
the electric motor is rotatable in first and second rotation directions opposed to each other; and
the first and second single direction bearings only allow each of the first and second output shafts to be rotated by the electric motor in opposite directions so that only the first or second output shafts rotates when the electric motor is rotated respectively in the first or second rotation directions.

6. The device as defined in claim 3, wherein the transmission element includes a flexible drive shaft jointly rotatable with the second output shaft.

7. The device as defined in claim 1, wherein the carriage biasing element includes an elongated and flexible resiliently deformable element extending between the body and the carriage.

8. The device as defined in claim 7, wherein the flexible resiliently deformable element is made of an elastomeric material.

9. The device as defined in claim 1, wherein
the carriage pulling mechanism includes an elongated threaded rod extending along the guide ramp and defining a rod longitudinal axis; and
the carriage includes a carriage body and a threaded element mechanically coupled to the carriage body and threadedly engaging the threaded rod, the threaded rod being operatively coupled to the power drive for being rotated by the latter when the power drive is in the carriage pulling mode and the release mechanism is in the engaged configuration.

10. The device as defined in claim 9, wherein the threaded element includes an arc segment shaped threaded portion abutting against the threaded rod.

11. The device as defined in claim 10, wherein the threaded element is mounted to the carriage body and movable relative thereto between rod engaged and rod disengaged positions, wherein, in the rod engaged position, the threaded element engages the threaded rod so that rotation of the threaded rod about the rod longitudinal axis moves the threaded element along the threaded rod, and, in the rod disengaged position, the threaded element is spaced apart from the threaded rod.

12. The device as defined in claim 11, wherein the threaded element remains longitudinally fixed relative to the carriage body when moved between the rod engaged and rod disengaged positions.

13. The device as defined in claim 12, wherein the threaded element is biased towards the rod engaged position.

14. The device as defined in claim 13, wherein the release mechanism includes an actuating element for selectively moving the threaded element between the rod engaged and rod disengaged positions.

15. The device as defined in claim 14, wherein
the actuating element abuts against the threaded element and is provided between the body and the threaded element;
at least one of the body and the actuating element defines at least two longitudinally spaced apart ramps each defining a guiding surface, the guiding surfaces being angled relative to the rod longitudinal axis, the actuating element and body abutting against each other at the ramps;

the actuating element is movable longitudinally along the body between actuating element first and second positions; and the ramps, the body and the actuating element are configured and sized so that when the actuating element moves between the actuating element first and second positions, the actuating element simultaneously moves transversally relative to the body so that when the actuating element is in the actuating element first position, the threaded element is in the rod engaged position, and, when the actuating element is in the actuating element second position, the threaded element is in the rod disengaged position.

16. The device as defined in claim 15, wherein the actuating element is biased towards the actuating element first position.

17. The device as defined in claim 16, further comprising a lever for selectively moving the actuating element between the actuating element first and second positions.

18. The device as defined in claim 1, wherein the tackle receiving element defines a cavity opening towards the guide ramp distal end for receiving at least part of the terminal tackle thereinto.

19. A fishing rod, comprising:

a pole;

a fishing line terminated with a terminal tackle;

a fishing reel mounted to the pole, the fishing line being stowable in the fishing reel, the fishing reel being selectively operable between a free spool mode wherein the fishing line can be cast and a line retrieving mode wherein the fishing line can be pulled and stowed in the fishing reel; and a fishing line casting device, the fishing line casting device including a body extending along at least part of the pole and mounted thereto, the body including a guide ramp, the guide ramp having a substantially elongated configuration and defining substantially longitudinally opposed guide ramp proximal and distal ends;

a carriage mounted to the ramp and movable longitudinally therealong, the carriage defining a tackle receiving portion for receiving the terminal tackle;

a carriage biasing element operatively coupled to the carriage and to the guide ramp for biasing the carriage towards the guide ramp distal end;

a power drive connected to a power source to receive power therefrom, the power drive being operable between an unpowered mode wherein the power drive is static and a carriage pulling mode wherein the power drive is powered;

a carriage pulling mechanism provided between the power drive and the carriage and operative for moving the carriage towards the ramp proximal end when the power drive is in the carriage pulling mode;

a release mechanism selectively movable between engaged and disengaged configurations, wherein the release mechanism is operatively coupled to the carriage pulling mechanism and to the carriage so that when the release mechanism is in the engaged configuration, the carriage pulling mechanism is operable by the power drive to move the carriage, and, when the release mechanism is in the disengaged configuration, the carriage and carriage pulling mechanism are disengaged from each other to allow movements of the carriage along the guide ramp independently of the carriage pulling mechanism; and a controller operatively coupled to the power drive to selectively change the power drive to one of the unpowered and carriage pulling modes.

\* \* \* \* \*